United States Patent
Mason et al.

(10) Patent No.: US 10,842,003 B2
(45) Date of Patent: Nov. 17, 2020

(54) AMBIENCE CONTROL SYSTEM

(71) Applicant: SIGNIFY HOLDING B.V., Eindhoven (NL)

(72) Inventors: Jonathan David Mason, Waalre (NL); Dzmitry Viktorovich Aliakseyeu, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/092,056

(22) PCT Filed: Apr. 4, 2017

(86) PCT No.: PCT/EP2017/057992
§ 371 (c)(1),
(2) Date: Oct. 8, 2018

(87) PCT Pub. No.: WO2017/174582
PCT Pub. Date: Oct. 12, 2017

(65) Prior Publication Data
US 2019/0166674 A1    May 30, 2019

(30) Foreign Application Priority Data
Apr. 8, 2016 (EP) .................................. 16164447

(51) Int. Cl.
*H05B 47/155* (2020.01)
*H05B 45/20* (2020.01)
*H04N 21/41* (2011.01)

(52) U.S. Cl.
CPC ....... *H05B 47/155* (2020.01); *H04N 21/4131* (2013.01); *H05B 45/20* (2020.01)

(58) Field of Classification Search
CPC .............. H05B 37/029; H05B 33/0857; H05B 37/0872; H04N 21/4131; H04N 21/42202
USPC ......................................................... 315/152
See application file for complete search history.

(56) References Cited

U.S. PATENT DOCUMENTS

| | | | |
|---|---|---|---|
| 2005/0206788 A1* | 9/2005 | Eves ........................ | H04N 5/64 348/602 |
| 2006/0062424 A1 | 3/2006 | Diederiks et al. | |
| 2007/0091111 A1* | 4/2007 | Gutta ....................... | H04N 5/58 345/591 |

(Continued)

*Primary Examiner* — Dedei K Hammond
*Assistant Examiner* — Amy X Yang
(74) *Attorney, Agent, or Firm* — Meenakshy Chakravorty (57) ABSTRACT

An entertainment system plays out audio and/or visual media into a region, wherein the media further comprises metadata specifying an optimal ambience setting for the media. A lighting system controls ambient lighting in the region, the lighting system comprising one or more luminaires, and the one or more luminaires comprising at least one moveable luminaire. Further, a controller determines one or more positioning instructions to specify a target position of the at least one moveable luminaire in order to achieve the optimal ambience setting specified in the metadata, and output the one or more positioning instructions in order to cause the at least one moveable luminaire to be repositioned. The controller then controls the ambient lighting by varying one or more light characteristics of the ambient lighting based on the metadata, such that the ambient lighting corresponds to the playing out of the media.

11 Claims, 5 Drawing Sheets

(56) References Cited

U.S. PATENT DOCUMENTS

| | | | |
|---|---|---|---|
| 2010/0177247 A1* | 7/2010 | Sekulovski | H05B 37/02 |
| | | | 348/602 |
| 2011/0075036 A1 | 3/2011 | Galeazzi et al. | |
| 2012/0068608 A1* | 3/2012 | Covaro | G01J 1/18 |
| | | | 315/151 |
| 2015/0130373 A1 | 5/2015 | Van De Sluis et al. | |
| 2015/0282282 A1 | 10/2015 | Breuer et al. | |
| 2015/0373810 A1 | 12/2015 | Aliakseyeu et al. | |
| 2017/0251538 A1* | 8/2017 | Green | H05B 37/029 |

* cited by examiner

AMBIENCE CONTROL SYSTEM

CROSS-REFERENCE TO PRIOR APPLICATIONS

This application is the U.S. National Phase application under 35 U.S.C. § 371 of International Application No. PCT/EP2017/057992, filed on Apr. 4, 2017, which claims the benefit of European Patent Application No. 16164447.1, filed on Apr. 8, 2016. These applications are hereby incorporated by reference herein.

TECHNICAL FIELD

The present disclosure relates to a system and method for controlling the ambience in an environment such as a room by means of ambient lighting.

BACKGROUND

Surround sound speaker systems provide a realistic acoustic effect by disposing multiple speakers at different angular positions in relation to a user, so as to create a multi-directional sound effect. These speakers are often very small, hidden away in a predefined positions. Lighting systems may also be connected to media players so to provide a more immersive entertainment experience.

However, unlike surround sound systems, the primary objective of lighting systems is to provide general illumination or decoration, and so there can be many different types of luminaires deposited at different locations in a given room. In addition, the locations of the luminaires are highly dependent on the interior design, i.e. lighting is generally less uniformly set up, and as a result it is difficult to achieve an ambience lighting optimized for media playback.

US2015/0282282 (Osram Sylvania) teaches a system where a user may control each of the luminaires based on a number of criteria. For example the ambient lighting in a room may be controlled based on the time of the day, or it may be set to light up to provide illumination when a mobile device is picked up or when media playback is paused, or it can be made relevant to the position of the user in that area and so to switch illumination between luminaires as the user moves. US2015/0282282 also discloses an example where the output from the luminaires produces an ambience effect complimentary to a video or audio media playback. In the particular example, once a scene content is known from a "light program", the luminaires may adjust the brightness and hue of the ambient light so to enhance the user experience (or immersion) of a particular type of movie, e.g. softer lighting for a romantic movie, or in some cases, the ambient light may enhance the effect of movie, e.g. flashing light to simulate lightning.

SUMMARY OF INVENTION

The lighting system provided in US2015/0282282 is configured to determine, among other factors, the position of each of the luminaires in an area. The system then provides dynamic control of the ambient lighting taking into account the spacing and positions of the luminaires in the area. For example, the brightness of a group of densely packed luminaries may be reduced to achieve a similar light intensity in comparison to a group of sparsely scattered luminaries. However the lighting system as taught in US2015/0282282 may not be able to achieve an optimal ambience control, at least not for rooms with badly positioned luminaries.

It would be desirable to provide a lighting system that is adaptable to any layout of a room or other space. Particularly, as recognized herein, there is a deficiency in US2015/0282282 in that it only adjusts the light output from the luminaries based on their locations and types. For example it is very difficult to achieve optimal light effect if a room is fitted with poorly distributed luminaries, e.g. part of a room may have very few or no luminaries installed, thus providing little or no ambience control. In addition, the level of ambience control is limited by the type of luminaires available, i.e. some of the luminaires may not be capable of emitting light with the required light characteristics.

According to one aspect of the present invention, there is provided equipment for providing ambience control in a region, the equipment comprising an interface to a lighting system wherein the lighting system is configured to provide ambient lighting in said region, the lighting system comprising one or more luminaires, and the one or more luminaires comprising at least one moveable luminaire repositionable within the region; an interface to an entertainment system wherein the entertainment system is configured to play out audio and/or visual media into the region, and wherein said media further comprises metadata specifying an optimal ambience setting specific to said media; and a controller. The controller is configured to: (a) receive said metadata via the interface with the entertainment system; (b) determine one or more positioning instructions to specify a target position of the at least one moveable luminaire in order to achieve the optimal ambience setting specified in the metadata, and output said one or more positioning instructions in order to cause the at least one moveable luminaire to be repositioned in said region according to the one or more positioning instructions; and (c) control the ambient lighting in said region via the interface to the lighting system, by varying one or more light characteristics of the ambient lighting based on the metadata such that the ambient lighting in said region corresponds to the playing out of the media.

In embodiments, the one or more luminaires of the lighting system may further comprise at least one fixed luminaire secured at a position in the region; wherein the controller may be configured to control the ambient lighting of said region by controlling one or more light characteristics of each of the at least one fixed luminaire and the at least one moveable luminaire.

In embodiments, the equipment may comprise an interface with one or more ambient lighting sensors configured to receive ambience information indicative of the ambient lighting in said region detected by the one or more ambient light sensors; and the controller may be configured to receive said ambience information and compare therewith the media specific optimal ambience setting from the metadata in order to produce said one or more positioning instructions.

In embodiments, the controller may be configured to obtain position information indicative of a current position of each of the one or more luminaires in said region, and to compare therewith the target position to produce said one or more positioning instructions; and the equipment may be configured to receive one or more user inputs from one or more user interfaces specifying at least some of said position information including at least the current position of the at least one movable luminaire. If the fixed luminaire(s) are also used, the "current" position of each of these is a fixed position, which could also be specified by the user interface(s), or could be accessed from a pre-stored database that was determined at the time of commissioning.

In embodiments, the controller may be configured to obtain position information indicative of a current position of each of the one or more luminaires in said region, and to compare therewith the target position to produce said one or more positioning instructions; and the equipment may comprise an interface with one or more position sensing devices configured to receive at least some of the position information including at least the current position of the at least one moveable luminaire from the one or more position sensing devices, said at least some of the position information being automatically detected by the one or more position sensing devices. If the fixed luminaire(s) are also used, the "current" position of each of these is a fixed position, which could also be detected by the position sensing device(s), or could be accessed from a pre-stored database that was determined at the time of commissioning.

In embodiments, the one or more light characteristics that are controlled comprise any one or more of: intensity, color, illumination pattern and/or direction of light projection.

In embodiments, the moveable luminaire may be a portable luminaire having an internal or wireless power supply.

In embodiments, the controller may be configured to cause said repositioning by outputting said one or more positioning instructions in human readable form to prompt one or more human users to manually perform said repositioning of at least one moveable luminaire. E.g. the one or more human readable positioning instructions may comprise a visual map and the controller may be configured to output the map to be viewed via a display.

Alternatively, wherein the controller may be configured to perform said repositioning by outputting said one or more positioning instructions in machine readable form in order to control a mechanism adapted to reposition the at least one moveable luminaire.

In embodiments, the entertainment system may comprise at least one of a TV, hi-fi, surround sound system, games console, desktop computer, laptop computer, tablet or smartphone for playing out the media into the region.

In embodiments, the controller may be configured to obtain luminaire information comprising at least one of a type and/or a position of each of the one or more luminaires of the lighting system; and the controller may be configured to compare said optimal ambience setting with the luminaire information in order to: assess a suitability of the one or more luminaires for achieving the optimal ambience setting, recommend provision of at least one additional movable luminaires if the one or more luminaires are not suitable for achieving the optimal ambience setting according to said assessment, repeat operations (a) and (b) above in relation to the one or more luminaires and the at least one additional movable luminaires if the provision of said at least one additional movable luminaires is recommended. To do this the equipment may be configured to receive one or more user inputs from one or more user interfaces specifying at least some of the luminaire information including at least the type and/or location of the at least one moveable luminaire; or the equipment may comprises an interface configured to receive at least some of the luminaire information including at least the type and/or location of the at least one moveable luminaire from one or more luminaire sensing devices (34), said at least some of the luminaire information being sensed by the one or more luminaire sensing devices. If the fixed luminaire(s) are also used, the position and/or type of these could also be specified by the user interface(s) or sensed by the position sensing device(s), or could be accessed from a pre-stored database that was determined at the time of commissioning.

In embodiments, the equipment may comprise an interface configured to receive ambience information indicative of the ambient lighting in said region sensed by one or more ambient lighting sensors; and the controller may be configured to compare said optimal ambience setting with the ambience information in order to: assess a suitability of the one or more luminaires for achieving the optimal ambience setting, recommend provision of at least one additional movable luminaires if the one or more luminaires are not suitable for achieving the optimal ambience setting according to said assessment, and repeat operations (a) and (b) above in relation to the one or more luminaires and the at least one additional movable luminaires if the provision of said at least one additional movable luminaires is recommended.

According to another aspect disclosed herein, there is provided a system for providing ambience control in a region, the system comprising: an entertainment system configured to play out audio and/or visual media into the region, wherein said media further comprises metadata specifying an optimal ambience setting specific to said media; a lighting system configured to control ambient lighting in said region, the lighting system comprising one or more luminaires, and the one or more luminaires comprising at least one moveable luminaire repositionable within the region; and a controller in communication with the entertainment system (20) and the lighting system. The controller is configured to: (a) determine one or more positioning instructions to specify a target position of the at least one moveable luminaire in order to achieve the optimal ambience setting specified in the metadata, and output said one or more positioning instructions in order to cause the at least one moveable luminaire to be repositioned in said region according to the one or more positioning instructions; and (b) control the ambient lighting in said region via the lighting system, by varying one or more light characteristics of the ambient lighting based on the metadata such that the ambient lighting in said region corresponds to the playing out of the media.

According to another aspect disclosed herein, there is provided a method of providing ambience control in a region by controlling a lighting system comprising one or more luminaires, the one or more luminaires comprising at least one moveable luminaire repositionable within the region, the method comprising: determining one or more positioning instructions to specify a target position of the at least one moveable luminaire in order to achieve an optimal ambience setting specified in a metadata embedded in an audio and/or visual media, said media being played out by an entertainment system into the region; outputting said one or more positioning instructions in order to cause the at least one moveable luminaire to be repositioned in said region according to the one or more positioning instructions; and controlling the ambient lighting in said region via the lighting system, by varying one or more light characteristics of the ambient lighting based on the metadata such that the ambient lighting in said region corresponds to the playing out of the media.

According to another aspect disclosed herein, there is provided a computer program product for providing ambience control in a region by controlling a lighting system comprising one or more luminaires, the one or more luminaires comprising at least one moveable luminaire repositionable within the region, the computer program product comprising code embodied on computer-readable storage and configured so as when run on one or more processing units to perform operations of: determining one or more positioning instructions to specify a target position of the at least one moveable luminaire in order to achieve an optimal ambience setting specified in a metadata embedded in an audio and/or visual media, said media being played out by an entertainment system into the region; outputting said one or more positioning instructions in order to cause the at least one moveable luminaire to be repositioned in said region according to the one or more positioning instructions; and controlling the ambient lighting in said region via the lighting system, by varying one or more light characteristics of the ambient lighting based on the metadata such that the ambient lighting in said region corresponds to the playing out of the media.

BRIEF DESCRIPTION OF THE DRAWINGS

The present invention will now be described, by way of example only, with reference to the accompanying drawings, in which.

DETAILED DESCRIPTION OF EMBODIMENTS

One recent direction in the development of luminaire technologies is the use of light scripts (i.e. metadata for controlling the ambient illumination emitted by luminaires) to enhance a movie watching or game playing experience. However, when a user configures an ambience control system for controlling the ambient illumination, the positions of luminaires relative to the user need to be determined (e.g. relative to the couch where (s)he sits and/or relative to the TV which the user watches). This allows ambience effects to be properly rendered (e.g. dropping ambience effects that cannot be rendered properly and/or adapting ambience effects based on the user's configuration).

The present invention additionally provides means to analyze a light script to determine if a moveable luminaire, e.g. a portable luminaire, can be repositioned such that better rendering of ambience effects is achieved.

For example a romantic movie may require illumination to be soft and the luminaires to be located behind the viewers, whereas an action movie may be best having the lights positioned on either side of the screen to maximize the visual effect of explosions appearing on the screen. Unless the user has a full set of light sources deposited around their screen, it is unlikely they will be able to experience all the available light effects as specified in the light scripts. To address this, before the start of the movie, the ambience control system according to the present invention will analyze the light script and map it with the user's lighting setup.

The system then checks if the lighting setup has a portable light source and if so recommends to the user where to position it for achieving the best possible effect for that particular light script. In other words, the controller comprised in the equipment for providing ambience control in the region is arranged for analyzing the received meta data specifying an optimal ambience setting, and based on the position of the one or more luminaires of the lighting system the controller determines the target position of the at least one moveable luminaire in order to more closely achieve the optimal ambience setting specified in the metadata.

The target position of the moveable luminaire may thus be defined by two parameters: (1) light effects specified in the light script and (2) location and types of other fixed and/or movable light sources. For ex ample for the romantic movie the recommendation might be to position moveable luminaires very close to the user to increase the atmospheric effect, while for the action movie the user might be asked to position the movable luminaries on the left side of the TV, because many explosion light effects occur on the left side of the screen and there are no fixed light sources installed there.

Figure 1:
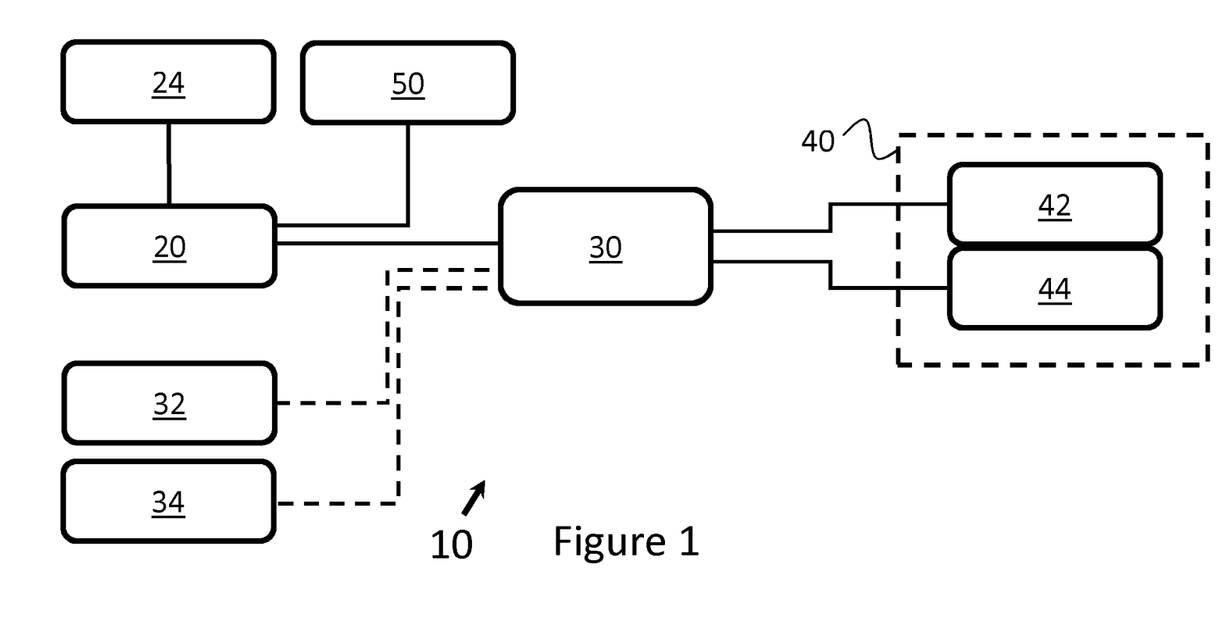
FIG. 1 is a schematic block diagram of an embodiment of an ambience control system according to the present invention.

FIG. 1 illustrates an example of an ambience control system 10 according to embodiments of the present invention. The ambience control system 10 comprises a controller 30 in communication with an entertainment system 20 and a lighting system 40. The lighting system comprises one or more moveable luminaires 44 and optionally one or more fixed luminaires 42, each arranged to contribute to ambient lighting in an environment occupied by one or more users. The entertainment system 20 is arranged to output audio and/or video media into said environment to be consumed by at least one of the one or more users. The ambience control system 10 may optionally comprise one or more sensors. The sensors may comprise one or more ambient light sensors 32 for detecting an ambience information indicative of the ambient lighting in said environment, and/or the sensors may comprise one or more positioning devices 34 for detecting the locations of each of the one or more luminaires 42, 44.

The controller 30 is provided with a suitable interface for communicating with each of the entertainment system 20, lighting system 40 and any sensor(s) 32, 34. The interface with each of the entertainments system 20, lighting system 40 and any sensors 32, 34 may comprise any one or more I/O devices for interfacing via any one or more types of signaling medium, and may employ any one or more communication protocols to do so. For instance, any of the communications between the relevant interface used by the controller 30 and the entertainment system 20, lighting system 40 and/or sensor(s) 32, 34 may be established by one or more wired connections such as Ethernet, DMX, optical fiber and/or powerline connections, or the communication may be made using wireless communication technology such as infrared or RF based technology, e.g. Bluetooth, Wi-Fi or ZigBee. The wireless communication technology herein refers to a wireless communication protocol plus the necessary capability to transmit and/or receive on a suitable medium over a suitable frequency range and for the technology in question (e.g. a certain RF band or bands). Any of the communications disclosed herein may be established using any one or more of the above-mentioned communications technologies and/or others.

Figure 2A:
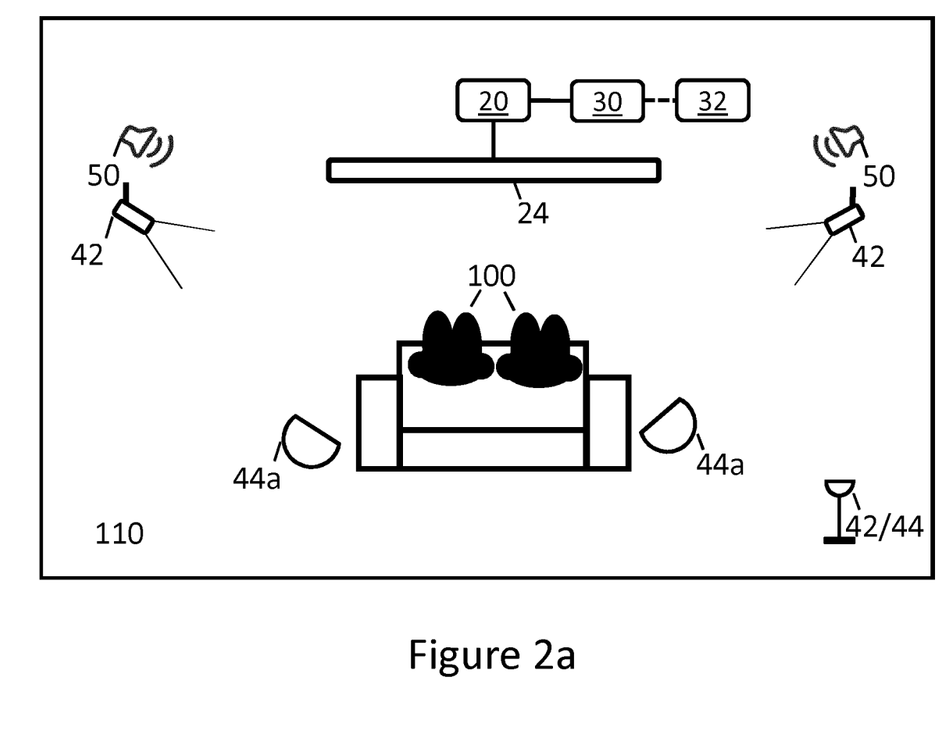
FIG. 2a is a plan view of a room employing the ambience control system in a first configuration of the system shown in FIG. 1.
Figure 2B:
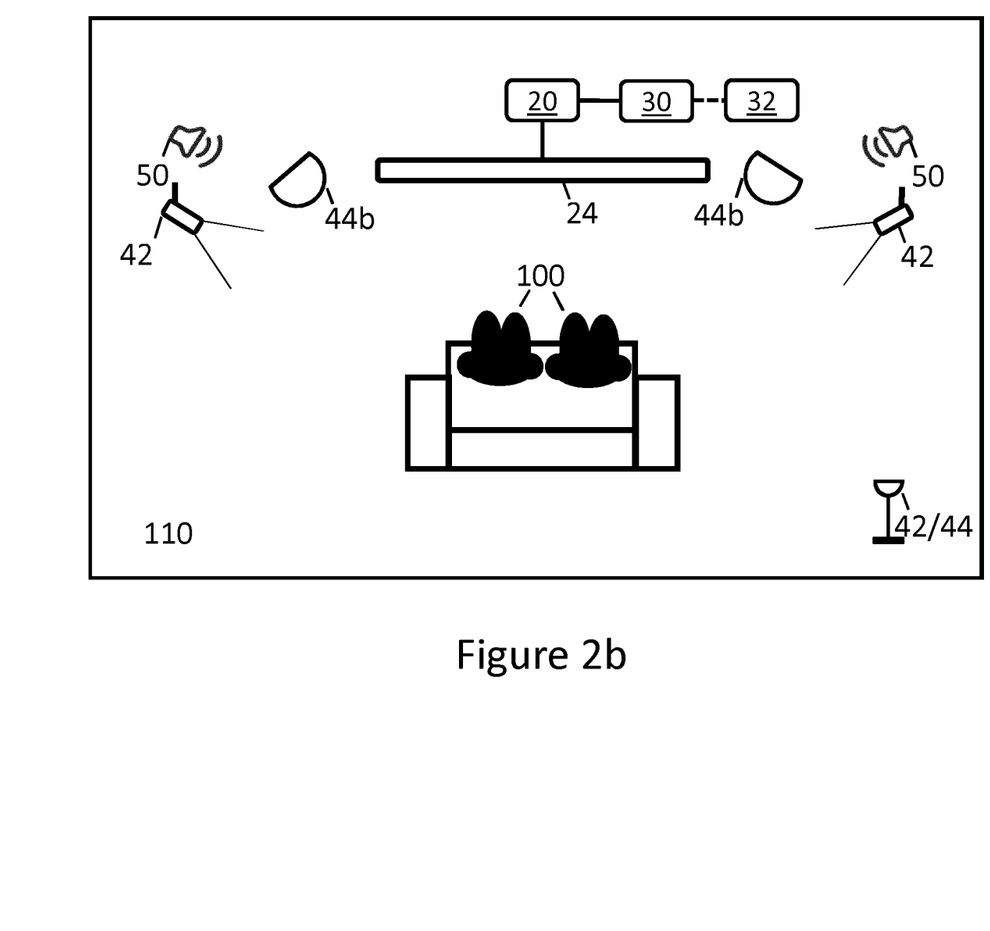
FIG. 2b is another plan view of the room employing the ambience control system in a second configuration of the system shown in FIG. 1.

FIG. 2 shows an example of ambience control system 10 being employed in an environment in the form of a room 110. The entertainment system 20 comprises at least one media player or game console. The entertainment system 20 provides playback (i.e. if a media player is employed) or gameplay (i.e. if a game console is being used) of audio and/or video media for users 100 in the room 110. Therefore the skilled person would understand that the term "media" in this application generally refers to any one of: audio only media (e.g. a song or sound track), video only media (e.g. a CCTV video feed), combined audio and video media (e.g. a movie), or an interactive media containing audio and/or video stream (e.g. a game or a video game). The audio and/or video media stream carries media specific metadata readable by the controller 30. The media player described herein may be an optical disc player such as Blu-ray, DVD, Laser Disc and/or Compact Disc player, or it can be any media player known to the person skilled in the art, for example an internet media player, radio, cassette tape or VHS player and/or a general purpose computer terminal. The games console, on the other hand, is an example of a user-interactive system that responds to user inputs and may be a purpose built game console such as PlayStation or Xbox, or it can be a game console integrated into the media player. In yet further embodiments the entertainment system may be general purpose computer such as a desktop computer, laptop computer, tablet or smartphone. Furthermore, note that the entertainment system 20 may be a portable entertainment system (e.g. a handheld system) or a non-portable entertainment system.

The entertainment system 20 outputs an audio and/or video stream to be played out through an audio playback subsystem 50 and/or a video playback subsystem 24, respectively. The video playback subsystem 24 comprises one or more displays through which video is output. Although the display 24 as shown in FIG. 2 is a TV, it can be any suitable visual display such as projectors or monitors. The audio playback subsystem 50 comprises one or more speakers through which the audio is output, e.g. one or more speakers integrated into the TV 24, or one or more standalone speakers, or a surround sound system 50. One or both the audio playback subsystem 50 and the video playback subsystem 24 can be mounted on permanent fixtures (e.g. wall mounted speakers and TVs), or they can be moveable playback subsystems where their placement in a room can be rearranged. Furthermore, a skilled person would readily understand that while the room 110 illustrated in the particular example is a living room (lounge) in the user's home or office, more generally it can be any spacing suitable for providing media playback, for example an entertainment venue such as a cinema, theatre and concert halls, or else the ambience control system 10 can be deployed in any open space such as a stadium or drive-in cinema.

The metadata as disclosed in this application may be referred to as a light script, i.e. a script or a set of instruction that prescribes the "optimal" ambience setting specific to the media. The optimal ambience setting may be "optimal" in the sense that it is prescribed by the producer or publisher of the media so as, based on their judgement, to most appropriately accompany the media (N.B. "optimal" as used herein therefore refers to the lighting ambience that has been determined as subjectively best to accompany the media, and is not necessary objectively optimal in any sense). In some embodiments the light script may be automatically determined from the content of media, e.g. the hue and brightness of a video stream or the rhythm if an audio stream. The optimal ambience setting specifies any one or more of light characteristics such as direction of light projection, intensity, color (e.g. color temperature, RGB values or YUV values) and/or spatial and/or temporal illumination pattern. The light script may for example be related to a video only or a combined audio and video stream, or it can be related to an audio-only stream, e.g. a sound recording. Using a movie as an example, the light script may for example dictate a constant level of ambience setting throughout the entire movie, e.g. a warm grow (e.g. lower light temperature) for a romantically themed movie, or a dimmed setting (e.g. lower light intensity) for horror films. Alternatively, the light script may define a time specific lighting ambience (i.e. time varying as a function of time). E.g. as an analogy, the light script may work in a similar way to subtitles where a set of metadata provides time specific on-screen subtitle display. For example the luminaries may be set to flash (e.g. inducing strobing light effects or turning on strobe lighting) in synchronization a tropical movie scene, or the luminaries 42,44 may be set to emit light at maximum brightness and/or higher light temperature so to simulate outdoor ambience when an outdoor scene is being displayed on screen 24. Alternatively, if the entertainment system 20 is a game console and the media being played is a video game, the ambience setting may be changed to a dimmed setting (e.g. lower light intensity) for horror themed games.

In general, the controller 30 carries out three basic functions: a) to receive and analyze a light script specific to the media being played; b) to analyze the type, setting and location of each of the one or more luminaires 42, 44 in the room 110; and c) to produce a set of one or more positioning instructions for repositioning each of the one or more moveable luminaires 44.

The controller 30 may be implemented on any suitable equipment comprising one or more physical units. For instance in embodiments the controller 30 may be implemented on the same physical unit or units as some or all of the entertainment system 20, e.g. a desktop computer, laptop computer, tablet, TV, set-top box or hi-fi unit through which the media is being consumed. In this case the above-mentioned interface to the entertainment system 20 may be an internal interface (e.g. internal wired connection) while the interface to the lighting system 40 may be an external interface. Alternatively the controller 30 may be implemented on the same physical unit or units as some or all or the lighting system 40, e.g. a lighting control server, dedicated lighting control unit (e.g. wall-panel or lighting bridge), or a general purposes computer such as a desktop, laptop, tablet or smartphone running a lighting control application. In such cases the above-mentioned interface to the lighting system 40 may be an internal interface (e.g. internal wired connection) and the interface to the entertainment system 40 may be an external interface. As another possibility, the controller 30 may be implemented on a separate unit extremal to both the lighting system 40 and the entertainment system 20, e.g. a server, or a general purpose computer terminal such as a desktop, laptop, tablet or smartphone (where this doesn't run a lighting control application, or at least not one responsible for the lighting in question).

Note that the controller 30 may or may not be physically present in the room 110; for example the controller 30 may be accessed locally or it can be accessed remotely from a data center through a network. Similarly, the light script may be accessed from the entertainment system 20, or the light script can be stored at the data center and accessed through the network. For example, it is possible to download a light script from the data center via the data network to complement the playback of a particular audio or video stream such as a vintage movie. Furthermore, the controller 30 may take the form of a central unit or a distributed control function implemented over multiple units (e.g. embedded in the entertainment system 20, sensors(s) 32, 34 and/or the lighting system 40). The controller 30 may be implemented in software code stored on a memory (comprising one or more storage devices) and arranged so as when run on a processor (comprising one or more processing units) to perform operations in accordance with the techniques disclosed herein. Alternatively the controller 30 may be implemented in dedicated hardware circuitry, or configurable or reconfigurable circuitry such as a PGA or FPGA, or any combination of software and hardware.

The controller 30, upon receiving the light script, carries out analysis to provide a set of instructions for implementing ambience control via the lighting system 40, i.e. the controller translates the light script into a particular lighting configuration for rendering said optimal ambience setting. For example, the controller 30 analyses the optimal ambience setting from light script and compares therewith a current map so to determine the ambience settings (light characteristic) to implement in each of the luminaires 42, 44 in the room.

The current map describes the present lighting configuration in the room 110. It may comprise information such as the quantity, type and/or position of luminaires 42, 44, as well as the position of the user 100 and/or video playback subsystem 24 and/or audio playback subsystem.

In some embodiments, the current map may be a generic (i.e. default or predefined) location map that represents one of the most common luminaire layouts in relation to the user 100 and/or display 24. E.g. such a layout may simply be a single overhead luminaire fixed onto the ceiling at the middle of the room 110, directly above the user 100, or any other common luminaire layout. In this case the user 100 may be able to choose, at a user interface (not shown) of the controller 30o, the generic location map from a selection of common luminaire layouts that bears the closest resemblance to the arrangement of luminaires 42, 44 found in room 110. Alternatively, the user 100 may be able to input, again at the user interface, information regarding the type and position (the location and direction of projection) of each of the luminaires in the room 110, so to create a bespoke current map. This way the bespoke current map describes the luminaires' layout more accurately than the user-chosen generic location maps. For example, the user 100 may specify, in detail, the type, distance and direction (in terms of direction of projected light and also angular position) of said luminaires 42, 44 in relation to each other and/or the user 100 and/or display 24. Moreover, the user 100 may also be able to input the plan of the room, i.e. the structure of the room, for providing an even more accurate current map, e.g. the user 100 may input through the user interface or remote control/smartphone, the dimension of said room 110 to the controller 30. The user may also be able to input, in the same manner, whether there are any pillars and obstructions that may obscure the illumination from the luminaires 42, 44.

The user interface comprises means for receiving a user input when choosing generic layouts, specifying luminaire position, and/or specifying other information when creating said current map. For example, the user interface may comprise a touch screen, point-and-click user interface or buttons for receiving user input. The user interface may comprise an integrated display for communicating with user 100, or it can be configured to project information on the display 24. The user interface may be implemented on a static terminal such as a TV or hi-fi unit the user is using to consume the media; and/or the user interface can be implemented on a remote controller, e.g. a dedicated remote control unit or a smartphone running a suitable client application ("app").

Alternatively or additionally, the controller 30 may use a positioning system 34 comprising one or more positioning devices to automatically determine the positioning information (i.e. location and/or orientation) of any of the above-mentioned entities 24, 32, 42, 44, 50, 100 and thereby create the current lighting map. The positioning system 34 may be configured to use any positioning technique known to the person skilled in the art, for example indoor positioning based on a radio frequency (RF) technology such as WiFi or Bluetooth, or using light such as infrared (IR) or visible light communications (VLC); or it can use an outdoor positioning technique such as satellite-based navigation (e.g. GPS or Galileo). The positioning system 34 may use any suitable positioning algorithm such a triangulation, trilateration, multilateration or fingerprinting to detect the positions of the luminaires and optionally also other elements such as the user, and thereby determine the current lighting map.

For instance in embodiments each of the luminaires 42, 44 is configured to embed a unique coded light signal into the illumination it emits (the signal comprising an ID of the respective luminaire), and the positioning system 34 comprises three or more light sensors disposed at different locations around the environment. In such cases a positioning module of the positioning system can detect a property of the received coded light signal such as received signal strength (e.g. RSSI), angle of arrival (AoA) or time-of flight (ToF) at each of three or more of the light sensors and detect the position using triangulation, trilateration, multilateration or fingerprinting. In a variant of this each luminaire 42, 44 may comprise an RF emitter or receiver and the positioning system comprises three or more RF anchor nodes, such that the positioning module can detect the position of each luminaire 42, 44 based on the RF signals transmitted (in either direction) between the luminaire and at least three of the anchor nodes. A similar technique can be used to detect any other object such as the user (e.g. the RF emitter or receiver takes the form of a mobile user device or tracking tag disposed about the user's person). In yet further variants, the positioning system 34 may comprise one or more 2D or 3D (depth aware) cameras arranged to view the environment and the positioning module may comprises an image recognition configured to recognize and detect the location of objects such as the luminaires 42, 44.

Whatever form it takes, the positioning module of the positioning system (i.e. the part that performs the actual positioning calculation) may be implemented in hardware and/or software, on one or more physical units, which may comprise one or more of the same or different units than that or those upon which the controller 30 is implemented. E.g. both could be on the same server or user terminal, or the positioning module of the positioning system 34 may be implemented on a separate location server.

Note also that in the case of the fixed luminaires 42, the location of these do not necessarily need to be input in-the-field by the (end) user nor sensed by the positioning system 34, though that is certainly one possibility. Alternatively, the controller 30 may simply access the locations of these from a pre-stored database, e.g. that may have been determined and stored by a commissioning technician at the time of commissioning.

In some embodiments the controller 30 may be configured to determine the types of the luminaires 42, 44 available in the room or environment, e.g. whether each is portable or fixed, and/or what lighting capabilities it has (e.g. what colors or range of colors is it capable or rendering). For instance if the luminaires 42, 44 are "connected" luminaires having a wired or wireless connection to the controller, then the controller 30 can read the type information from the luminaires 4 via this connection.

Optionally the system may further comprise at least one ambient light sensor 32 to sense ambience information indicative of the ambient lighting at the ambient light sensor 32, for providing feedback during reposition of moveable luminaires 44. Ambience information described herein comprises light characteristics such as intensity and/or color received at the position of the ambient light sensor 32, i.e. it is indicative of the ambient lighting in the room 110. The ambient light sensor 32 may be one or more standalone light sensor(s) or it can be light sensor(s) integrated into the same unit as the controller 30. The ambient light sensors 32 may be placed in the vicinity of the user 100 to detect ambience information perceivable by the user 100. In embodiments the ambient light sensor 32 can be integrated to a mobile device of the user such as a smartphone or dedicated remote control device. In some cases the ambience control system 10 may be connected to the user's smartphone through the client applications installed on the smartphone, and as such an optical camera built-in to the smartphone can be used as the ambient light sensor 32. Alternatively or additionally, multiple light sensors 32 may be strategically deposited around the room, so to provide ambience information at various positions across the room 110. Optionally, the ambient light sensor 32 may be able to pan or zoom, manually or automatically, with the use of suitable mechanisms so to be able to sense localized ambience information in different directions. Alternatively, the sensor 32 may have a broad field of vision so to be able to capture required ambience information without panning or zooming.

The ambient light sensors 32, standalone or in their multiples, may be used to sense global ambience information, i.e. detecting the (combined) light characteristics of one or more luminaires, including natural lights and ambience effect contributions from the luminaires 42, 44. For instance this may be especially useful if the luminaires 42, 44 are "unconnected" luminaires that cannot communicate with the controller 30 and so cannot report their light output settings directly (which is another option).

Note: in the case where multiple light sensors 32 are used, then while the light sensors 32 and the positioning system 34 may be described herein as two separate functional entities, some or all of the same physical light sensor units may be used for both. For example, the same light sensors 32 that are used to sense the ambient light characteristics can be also used to identify each of the luminaires in the room 110 by their light characteristics during calibration (i.e. when creating the current map). For example, the controller 30 may instruct each of the luminaires 42, 44 to emit light with a unique light characteristic (i.e. at a given frequency and light temperature) in turn or simultaneously, as such upon sensing the unique light characteristic of the received light signal, the ambient light sensors 32 will be able to identify the direction and type of each of the luminaires 42, 44 in the room 110. Furthermore, in the case where a plurality of ambient light sensor 32 are used, the position and relative distance between the luminaires and the ambient light sensor 32 can be obtained through any optical positioning technique known to the person skilled in the art, for example triangulation, trilateration, multilateration or fingerprinting techniques based on coded light. Therefore, the plurality of ambient light sensors 32 may function as positioning devices 34 when their outputs are applied accordingly.

In some embodiments, the sensors 32, 34 can detect the layout of the room 110 for rendering the current map. If an ambient light sensor 32 is employed, the detection may be carried using any suitable image analysis technique known to the person skilled in the art. For example, the image analysis technique may be able to detect walls, mirrors and furniture that obscures or undesirably reflects illumination. The sensor may comprises positioning device 34 or other suitable non-optical technique such as ultrasound measurement for measuring the layout of the room 110. Therefore, it can be understood that the use of sensor(s) 32, 34 permits the automatic creation of a calibration map, comprising the position and light characteristic of each of the luminaires 42, 44, and optionally one or more of global ambience information, the position of user 100 and/or display 42, and/or the layout of the room 110. According to embodiments of the present invention the controller 30 is configured to perform a comparison between the optimal ambience setting as specified in the light script and the present lighting system configuration described in current lighting map (e.g. the user selected generic map or the sensed configuration), wherein the compared information on the present configuration may comprise the positions of the luminaires 42, 44 in the room 110, the types of the luminaires 42, 44, and/or the ambient lighting effect they are currently achieving, and optionally other information such as the position of the user and/or entertainment system 20 (any of which may be determined according to any of the techniques described above or others). Based on this comparison, the controller 30 determines a target position (location and/or direction of light projection) for each of the one or more moveable luminaires 44 for achieving (or at least providing an ambience effect closer to) said optimal ambience setting, and subsequently produce a set of one or more positioning instructions for positioning or repositioning of the moveable luminaire(s) 44.

For example the set of one or more positioning instructions may take the form of a positioning map. The positioning map can be in a human readable form for instructing one or more users to manually reposition the moveable luminaries 44 to said target positions. The positioning map may be a set of written instruction, given visually or vocally, to provide the users 100 guidance on positioning moveable, e.g. the written instruction may be " . . . now place the moveable luminaires 44a behind or closer to the user 100" to create a cozy atmospheres and mimic a fireplace effect desirable in a romantic themed movie (see FIG. 2a), or the written instruction may be " . . . please move the moveable luminaires 44b next to the display 24 facing away from the user 100" to replicate ambience experienced in scenes of explosions in action movies (see FIG. 2b). Or else, the written instruction may be given to the user with a much higher degree of precision, in order to achieve an ambience effect/output closely matching the optimal ambience setting as specified in the light script, for example the instruction may be expanded to " . . . relocate the moveable luminaires 44b to a position parallel to and about 10 cm on either side of the display 24, with light projection pointing outwardly at a 45° angle to normal . . . ".

The positioning map can also be a graphical representation of the room 110, i.e. it can be in the form of a map being displayed on the video playback subsystem 24, or the map may be displayed on a screen on the remote control or the smartphone. This allows the user 100 to understand and follow the instructions in a much easier and more accurate manner.

In some embodiments, the controller 30 may be configured to use the ambient lighting sensor(s) 32 and/or positioning device(s) 34 to provide feedback to the user 100 for carrying out fine-tuning or readjustment. For example, once the user 100 has confirmed repositioning of moveable luminaries 44 with the controller 30, the sensors 32 and/or the positioning device 34 may carry out an additional check to confirm whether the moveable luminaries 44 are indeed in compliance with said target positions. If the difference between the present configuration of the moveable luminaries 44 (their actual location and/or direction of their projected light) and said target position are detected to be larger a pre-defined threshold, e.g. a separation of 5 cm or a 20° misalignment, the controller 30 will opt to repeat the process to produce a new set of positioning instructions in order to facilitate the repositioning of moveable luminaries 44.

The positioning map may alternatively be output in a machine readable format for being received at a motorized moveable luminaire 44. Each of the motorized moveable luminaires may be equipped with a positioning device 34, or they position may be determined by the controller 30 using any suitable positioning techniques such as optical positioning techniques, in order to carry out automatic positioning. For example upon receiving the positioning map, each of the individual motorized moveable luminaires 44 may compare the coordinates of their current position and compare therewith the target positions, and subsequently manoeuvre/reposition themselves automatically into the above-mentioned target positions. Advantageously, the motorized moveable luminaires 44, may constantly gauge their current position against the co-ordinates of the target positions, such that they may carry out repositioning throughout the duration of movie repeatedly in an automated fashion. For example said motorized moveable luminaires 44 reposition/redistribute themselves to suit different scenes according to the light script. The motorized moveable luminaires 44 may comprise wheels and steering mechanisms for maneuvering across the room 110, or they can be adapted to travel on rails or any other suitable means.

The moveable luminaires 44 are not securely fixed onto any surface of room 110. They can be powered by a mains power supply, or alternatively they can be portable luminaires having an internal power source including any one of single use batteries, rechargeable batteries, fuel cells and photovoltaic panels; the portable luminaires may further comprise wireless power supply, for example inductive (magnetic) coupling, radiative techniques or any wireless power supply known to the person skilled in the art. A commercially available example of said moveable luminaire is Philips Hue Go which can be powered by the mains or rechargeable batteries and is capable of synchronizing ambience effect with an audio and/or visual playback.

In comparison, a fixed luminaire 42 by definition, is secured onto a fixed surface in the room 110. A fixed luminaire 42 may take any suitable form such as a ceiling or wall mounted luminaire, a wall washer, or a less conventional form such as a luminaire built into a surface or an item of furniture, or any other type of illumination device for emitting illumination into the room 110 so as to induce a change in the ambience effect. The exact position and type of fixed luminaires 42 is dependent on the interior design of the room 110 and thus the use of fixed luminaires 42 alone would not necessarily provide optimal ambience setting as specified in the light script. In addition, the installation of a set of fixed luminaires 42 may be geared towards providing ambience effects for a particular movie type and perhaps not suitable for rendering for other movie types, e.g. lighting installed in the vicinity of the display 24 may not be able to render an ambience of a soft glow required in a romantic film, as it requires luminaires to be placed rearward of the user 100.

Figure 3:
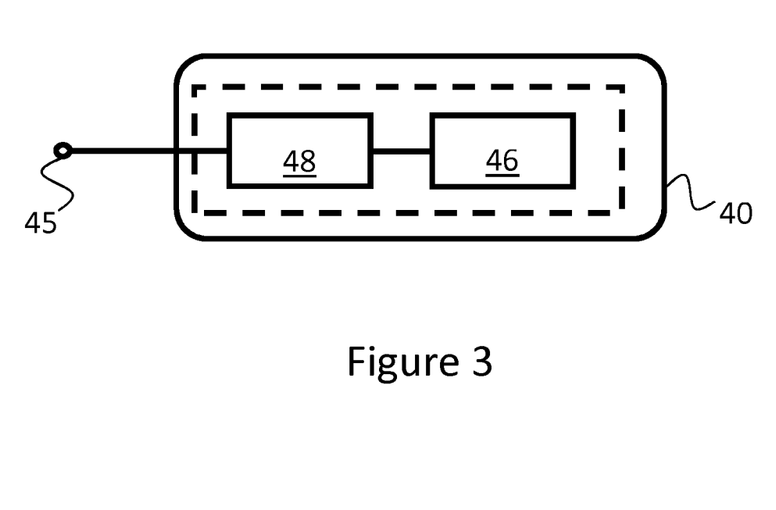
FIG. 3 is another schematic block diagram of a lighting system according to an embodiment of the present invention.

As shown in the schematic block diagram of FIG. 3, each of the luminaires 40 (42, 44) comprises a housing or support (not shown), one or more light emitters (lamps) 46 and a light control unit 48 in communication with the controller 30 via connection 45. The light control unit 48 serves to control the power supply and lighting characteristic of the light emitter(s) 46 based on lighting control commands from the controller 30. The one or more light emitters 46 may be any emitters suitable for illumination, for example LEDs, incandescent bulbs, halogen lamps, florescence lamps, arc lamps, strobe lights and discharge lamps. There may be multiple light emitters 46 in a luminaire, wherein each of the multiple light emitters 46 may be of the same or different types. A light control unit 48 may control the one or more light emitters 46 in the same luminaire 40; and in the case where a luminaire 40 comprises a plurality of light emitters 46, the individual light signatures from each the plurality of light emitters 46 may be different or synchronized. For example, the light emitters in a given luminaire 40 may comprises halogen and strobe lights, each independently controlled by the same light control unit 48 of luminaire 40.

Figure 4:
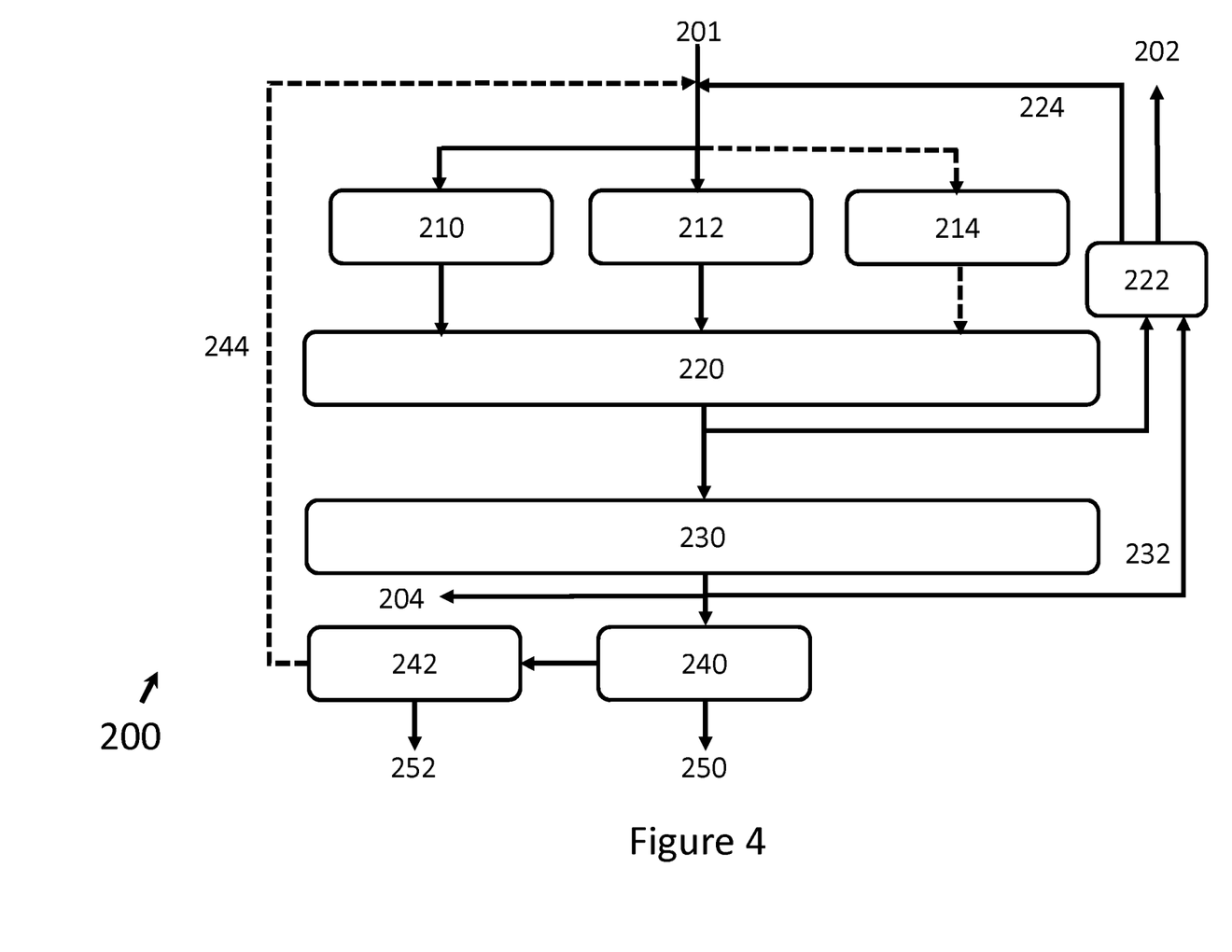
FIG. 4 is a flow chart showing a process for operating the ambience control system according to an embodiment of the present invention.

FIG. 4 is a flow chart showing steps for producing a positioning map according an embodiment of the present invention. The process 200 starts at 201, where the controller 30 establishes communication with the media player 20 and the one or more available luminaires 42, 44 in the room 110, and optionally the sensors 32, 34. The controller 30 may actively detect all the available luminaries (moveable or fixed) in the room 110, or the user 100 can pair each of the available luminaires with the controller 30 in turn. The controller 30 may identify the type of luminaires 42, 44 through said communication, or the type of the luminaries 42, 44 may be detected by the sensors 32, 34 or input by user 100 at the user interface. The controller 30 will then progress to a) extract 210 the metadata containing light script (and the media specific optimal ambience setting) from the entertainment system 20, or acquire said metadata from the data center through a network, b) identify 212 the availability, types and capabilities of each of the luminaires 42, 44 in the room 110, and optionally c) determine 214 a global ambience, as well as the ambience effect and positioning information of each of the luminaires 42, 44 if sensors 32, 34 is made available. The information may be readily collected and compared 220 at the controller 30 to determine whether the connected luminaires 42, 44 are suitable (or sufficient) to render the optimal ambience setting as specified in the light script. If this is not the case the controller 30 signals 222 to the user, visually or vocally, to provide additional moveable luminaires. In some cases controller may recommend 222 to the user the quantity and types of additional moveable luminaires needed in order to render the optimal ambience setting as specified in the light script. In some embodiments, the signal 222 may be an advertisement for advertising moveable luminaires of a particular brand, or it may be a web-link for directing user to a website for purchasing said moveable luminaires. For example, the recommendation may be moveable LED luminaires to place an incandescent luminaire to achieve a particular color temperature. Subsequently, upon receiving confirmation form the user that an additional moveable luminaires are added to the lighting system 224 the process 212 and 214 will be repeated.

However if additional moveable luminaires 222 are not provided, or if the additional moveable luminaires 222 are not sufficient to satisfy the ambience requirements set out in the light script, the process control terminates 202. The controller 30 may set up a pre-determined timer such that upon expiry of a time limit, the ambience control system plays or replays the advertisement 222 to prompt the user to provide additional movable luminaires 44.

The controller 30, at this stage, may compute and remove certain ambience settings specifying effects that are inappropriate (i.e. unsuitable) for rendering using the presently available luminaires 42, 44, whilst keeping those ambience effects (i.e. ambience settings) that are suitable for rendering. In this case the process continues 230.

Once the controller 30 has confirmed the availability and sufficiency of (moveable and/or fixed) luminaires, the controller 30 may proceed to produce 230 a current map or allow the user to choose a generic map that bears resemblance to the room 110 as described earlier. For example if a sensor 32, 34 is not installed, the control unit may permit user 100 to choose a generic map from a pool of commonly adopted lighting layouts most suited to the room 110. In some embodiment the user 100 may be asked to indicate the type and approximate location of the luminaires in the room in relation to the display 24 and/or the user 100 for creating a current map. Or alternatively if sensors 32, 34 are made available, the controller may automatically recreate the current map using positioning information obtained from the positioning devices 34 and/or the above-mentioned optical positioning method. The current map or generic map may additionally include a layout of the room 110. It is also possible that upon producing the current map (e.g. choosing a generic map) the controller 30 may additionally indicate 222 to the user, again visually or vocally, to provide additional moveable luminaires 44. This is especially true if the interior design or decoration of room 110 is unconventional; i.e. additional moveable luminaires 44 are required to provide lighting for obscured areas.

The controller 30 then proceed to compare the optimal ambience setting specified in the light script with the current map and determine 240 the optimal positioning of the moveable luminaires 44. It may be possible that the moveable luminaires 44 are already placed in optimal positions, i.e. there is no change in optimal ambience setting from a previous playback, and so the process terminates 250. Alternatively in a more likely scenario, the controller 30 outputs 242 a positioning map, visually (graphical representation or as written instructions) and/or verbally, for directing the user 100 to reposition said moveable luminaires 44. The process terminates 252 once the user 100 has positioned the moveable luminaires 44 according to the positioning map. Alternatively machine readable positioning map are generated 242 for automatic deployment of moveable luminaires 44.

If sensors 32, 34 are made available they may be used for providing feedback control for fine-tuning and readjustment of moveable luminaires 44. For example, once the user 100 confirms 244 the repositioning of moveable luminaires 44, the process 200 may start again at 201. In the case where the user 100 has not been correctly following the positioning map a new positioning map will be generated 240, or if the feedback control confirms correct placement of moveable luminaires 44, the process terminates at step 204 or step 250.

In another embodiment according to the present invention, one or more generic light scripts may be used that are specific to a particular category of the media being played out, rather than a specific title. For example, the generic light scripts may be an ambience setting particularly suitable for playing video games, reading e-books, or one that is suitable for late night viewing. The generic light script may be a generic setting for initial set up of the ambience control system 10; for example, it may recommend the user the optimal location for the moveable luminaire 44 for more general viewing. Of course the skilled person would understand that prior to or during a playback of a movie the generic light script can be replaced by the media specific light script, i.e. ambience control may be switchable between a generic light script and a media specific light script.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Equipment for providing ambience control in a region and for outputting repositioning instructions in human readable form to prompt repositioning of at least one movable luminaire to a target position, the equipment comprising:

an interface to a lighting system wherein the lighting system is configured to provide ambient lighting in said region, the lighting system comprising one or more luminaires, and the one or more luminaires comprising the at least one moveable luminaire repositionable within the region;

an interface to an entertainment system (20) wherein the entertainment system is configured to play out audio and/or visual media into the region (110), and wherein said media further comprises a light script specifying an optimal ambience setting specific to said media; and     a controller arranged for:

a) receiving said light script via the interface with the entertainment system;

b) obtaining position information indicative of a current position of each of the one or more luminaires;

c) determining a target position of the at least one moveable luminaire based on the position information, in order to achieve the optimal ambience setting specified in the light script;

d) determining one or more positioning instructions to specify the target position of the at least one moveable luminaire;

e) output said one or more positioning instructions in human readable form to prompt one or more human users to manually perform said repositioning of the at least one moveable luminaire in said region according to the one or more positioning instructions; and       f) controlling the ambient lighting in said region via the interface to the lighting system, by varying one or more light characteristics of the ambient lighting based on the light script such that the ambient lighting in said region corresponds to the playing out of the media;

wherein the equipment is arranged for receiving one or more user inputs from one or more user interfaces specifying at least some of said position information including at least the current position of the at least one movable luminaire; or wherein the equipment comprises an interface with one or more position sensing devices arranged for receiving at least some of the position information including at least the current position of the at least one moveable luminaire from the one or more position sensing devices, said at least some of the position information being automatically detected by the one or more position sensing devices.

2. The equipment as claimed in claim 1, wherein the one or more luminaires of the lighting system further comprise at least one fixed luminaire secured at a position in the region; and wherein the controller is further arranged for controlling the ambient lighting of said region by controlling one or more light characteristics of each of the at least one fixed luminaire and the at least one moveable luminaire.

3. The equipment as claimed in claim 1, wherein the equipment comprises an interface with one or more ambient lighting sensors arranged for receiving ambience information indicative of the ambient lighting in said region detected by the one or more ambient light sensors; wherein the controller is further arranged for receiving said ambience information and comparing therewith the media specific optimal ambience setting in order to produce said one or more positioning instructions.

4. The equipment as claimed in claim 1, wherein the one or more light characteristics comprise any one or more of: intensity, color, illumination pattern and/or direction of light projection.

5. The equipment as claimed in claim 1, wherein the one or more human readable positioning instructions comprise a visual map and the controller is arranged for outputting the map to be viewed via a display.

6. The equipment as claimed in claim 1, wherein the controller is further arranged for obtaining luminaire information comprising at least one of a type and/or a position of each of the one or more luminaires of the lighting system; and wherein the controller is further arranged for comparing said optimal ambience setting with the luminaire information for:
assessing a suitability of the one or more luminaires for achieving the optimal ambience setting;
recommending provision of at least one additional movable luminaires if the one or more luminaires are not suitable for achieving the optimal ambience setting according to said assessment; and
repeating (a) and (b) in relation to the one or more luminaires and the at least one additional movable luminaires if the provision of said at least one additional movable luminaires is recommended;
wherein the equipment is arranged for receiving one or more user inputs from one or more user interfaces specifying at least some of the luminaire information including at least the type and/or location of the at least one moveable luminaire; or wherein the equipment comprises an interface arranged for receiving at least some of the luminaire information including at least the type and/or location of the at least one moveable luminaire from one or more luminaire sensing devices, said at least some of the luminaire information being sensed by the one or more luminaire sensing devices.

7. The equipment as claimed in claim 1, wherein the equipment comprises an interface with one or more ambient light sensors arranged for receiving ambience information sensed by the one or more sensors indicative of the ambient lighting in said region; and
wherein the controller is arranged for comparing said optimal ambience setting with the ambience information for:
assessing a suitability of the one or more luminaires for achieving the optimal ambience setting,
recommending provision of at least one additional movable luminaires if the one or more luminaires are not suitable for achieving the optimal ambience setting according to said assessment, and
repeating (a) and (b) in relation to the one or more luminaires and the at least one additional movable luminaires if the provision of said at least one additional movable luminaires is recommended.

8. A system comprising the equipment as claimed in claim 1, and further comprising the lighting system, wherein the moveable luminaire is a portable luminaire having an internal or wireless power supply.

9. A system comprising the equipment as claimed in claim 1, and further comprising the entertainment system, wherein the entertainment system comprises at least one of a TV, hi-fi, surround sound system, games console, desktop computer, laptop computer, tablet or smartphone for playing out the media into the region.

10. A method of providing ambience control in a region and of outputting repositioning instructions in human readable form to prompt repositioning of at least one movable luminaire to a target position, by controlling a lighting system comprising one or more luminaires, the one or more luminaires comprising the at least one moveable luminaire repositionable within the region, the method comprising:
obtaining position information indicative of a current position of each of the one or more luminaires;
determining a target position of the at least one moveable luminaire based on the position information, in order to achieve the optimal ambience setting specified in a light script embedded in an audio and/or visual media, said media being played out by an entertainment system into the region;
determining one or more positioning instructions to specify the target position of the at least one moveable luminaire;
outputting said one or more positioning instructions in human readable form to prompt one or more human users to manually perform said repositioning of the at least one moveable luminaire in said region according to the one or more positioning instructions; and
controlling the ambient lighting in said region via the lighting system, by varying one or more light characteristics of the ambient lighting based on the light script such that the ambient lighting in said region corresponds to the playing out of the media;
wherein some of said position information is obtained from one or more user inputs, received via one or more user interfaces, specifying position information including at least the current position of the at least one movable luminaire; or wherein some of said position information is obtained from one or more position sensing devices arranged for automatically detecting at least some of the position information including the current position of the at least one moveable luminaire.

11. A non-transitory computer-readable storage medium comprising computer program product for providing ambience control in a region and for outputting repositioning instructions in human readable form to prompt repositioning of the at least one movable luminaire to a target position, by controlling a lighting system comprising one or more luminaires, the one or more luminaires comprising the at least one moveable luminaire repositionable within the region, the computer program product comprising code configured so as when run on one or more processing units, performs operations of:

obtaining position information indicative of a current position of each of the one or more luminaires;

determining a target position of the at least one moveable luminaire based on the position information, in order to achieve the optimal ambience setting specified in a light script embedded in an audio and/or visual media, said media being played out by an entertainment system into the region;

determining one or more positioning instructions to specify the target position of the at least one moveable luminaire;

outputting said one or more positioning instructions in human readable form to prompt one or more human users to manually perform said repositioning of at least one moveable luminaire in said region according to the one or more positioning instructions; and     controlling the ambient lighting in said region via the lighting system, by varying one or more light characteristics of the ambient lighting based on the light script such that the ambient lighting in said region (110) corresponds to the playing out of the media;

wherein some of said position information is obtained from one or more user inputs, received via one or more user interfaces, specifying position information including at least the current position of the at least one movable luminaire; or wherein some of said position information is obtained from one or more position sensing devices arranged for automatically detecting at least some of the position information including the current position of the at least one moveable luminaire.

\* \* \* \* \*